United States Patent [19]

Dorf et al.

[11] Patent Number: 5,138,031
[45] Date of Patent: Aug. 11, 1992

[54] LINEAR AND BRANCHED POLY-P-ARYLENE SULFIDE SUBSTANTIALLY FREE FROM DEFECT STRUCTURES HAVING PLURAL ABSORPTION MAXIMA

[75] Inventors: Ernst-Ulrich Dorf; Wolfgang Rüsseler, both of Krefeld; Günther Weymans, Leverkusen; Manfred Schmidt, Krefeld; Erich Meier, Leverkusen, all of Fed. Rep. of Germany

[73] Assignee: Bayer Aktiengesellschaft, Leverkusen, Fed. Rep. of Germany

[21] Appl. No.: 434,804

[22] Filed: Nov. 13, 1989

[30] Foreign Application Priority Data

Nov. 23, 1988 [DE] Fed. Rep. of Germany ....... 3839442

[51] Int. Cl.$^5$ ............................................. C08G 75/14
[52] U.S. Cl. .................................... 528/388; 524/609
[58] Field of Search ....................... 528/388; 524/609

[56] References Cited

U.S. PATENT DOCUMENTS 3,354,129  11/1967  Edmonds, Jr. et al. ............ 528/265

FOREIGN PATENT DOCUMENTS 0142024  5/1985  European Pat. Off. .
0214471  3/1987  European Pat. Off. .
0266662  5/1988  European Pat. Off. .

Primary Examiner—John Kight, III
Assistant Examiner—T. Mosley
Attorney, Agent, or Firm—Connolly & Hutz

[57] ABSTRACT

The invention relates to linear and branched poly-p-arylene sulfides (PAS), preferably poly-p-phenylene sulfides (PPS), which have an extremely low proportion of defect or foreign structures, to a process for their production and to their use for the production of molded articles.

19 Claims, 12 Drawing Sheets

ENERGY (eV)

LINEAR AND BRANCHED POLY-P-ARYLENE SULFIDE SUBSTANTIALLY FREE FROM DEFECT STRUCTURES HAVING PLURAL ABSORPTION MAXIMA

This invention relates to linear and branched poly-p-arylene sulfides (PAS), preferably poly-p-phenylene sulfides (PPS), which have an extremely low proportion of defect or foreign structures, to a process for their production and to their use for the production of molded articles.

Polyarylene sulfides are known, for example from US-PS 3,354,129 and EP-A 171 021. By virtue of their thermal and mechanical properties and their high chemical stability, they are valuable starting materials for the production of fibers, films and moldings. They are used, for example, in the automotive field, in the electrical field and in the electronics field. They are flameproof, dimensionally stable, heat-resistant and show good electrical properties.

Possible outgassings of PAS as a result of defects and/or impurities in the polymer can lead to inhomogeneous moldings and to corrosion problems during processing and application.

It is known that PAS having a low percentage of impurities can be produced by purification of the polymers, cf. for example EP-A 96 384, 104 560, DES 3 524 471, EP-A 242 617, 265 524, JP-A 62 220 522. However, the polymers obtained by these purification methods are not always entirely satisfactory.

It is known that the disadvantages mentioned are caused not only by impurities in the polymer, but also by defect or foreign structures in the polymer matrix.

It is known that defect structures in the polymer can be reduced by variation of the production process, for example by production of PAS in the absence of air, etc. The addition of inorganic or organic salts to the reaction mixture (cf. for example DE-OS 2 623 362, 2 623 363) has also been recommended. Improved products have been obtained, for example, by addition of esters, anhydrides, aminoacids or lactams (cf. for example EP-A 171 021). The improved polyarylene sulfides known from EP-A 171 021 show favorable rheological behavior.

Although useful polymers can be obtained by these known measures, defect or foreign structures in the polymer cannot be avoided in this way.

The defect structures in the polymer can cause macroscopic damage in the event of thermal stressing (for example under the conditions prevailing during the processing and production of moldings) either on their own or in conjunction with impurities in the polymer.

In addition, partially crystalline thermoplastics, which derive their favorable properties in large measure from the order of their crystal structure, can be affected in such properties as degree of crystallization, crystallization rate, crystallization morphology and melting behavior by disruptions in uniformity.

The improved polyarylene sulfides known from EP-A 171 021 show favorable rheological behavior. Linear and branched poly-p-arylene sulfides have now been found which contain very few defect structures, preferably poly-p-phenylene sulfides, which show the well-known favorable rheological behavior.

Accordingly, the present invention relates to linear and branched poly-p-arylene sulfides, preferably poly-p-phenylene sulfides, characterized in that, in the XANES spectrum at the K edge of the sulfur atom (as measured in transmission with an accuracy of energy determination (relative and absolute) of at least ±0.1 eV), they have two absorption maxima in the energy range from 2470 to 2490 eV, namely a) one in the energy range from 2470 to 2475.5 eV, preferably in the energy range from 2473 to 2475 eV and more preferably in the energy range from 2473.5 to 2474.1 eV and b) one in the energy range from 2475.5 to 2490 eV, preferably in the energy range from 2478 to 2482 eV and more preferably in the energy range from 2480.8 to 2481.4 eV, and the absorption maximum of highest intensity lies in the energy range a) and the absorption maximum in the energy range b) has at most 85%, preferably at most 80% and more preferably at most 73% of the intensity of the absorption maximum in the energy range a).

Figure 1A:
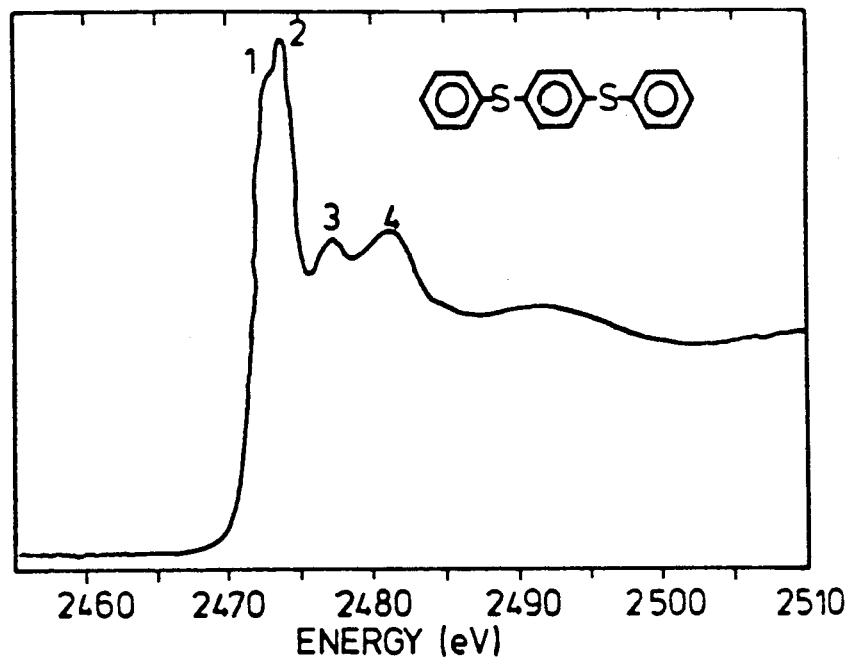
FIGS 1(a) - 1(n) represent standardized XANES spectra of the compounds listed in Table 1.
Figure 1B:
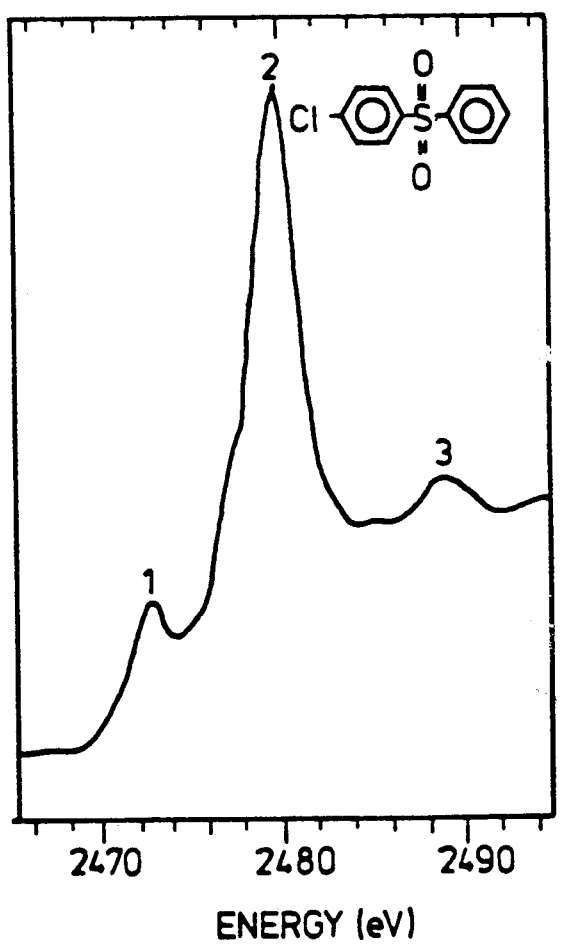
Figure 1C:
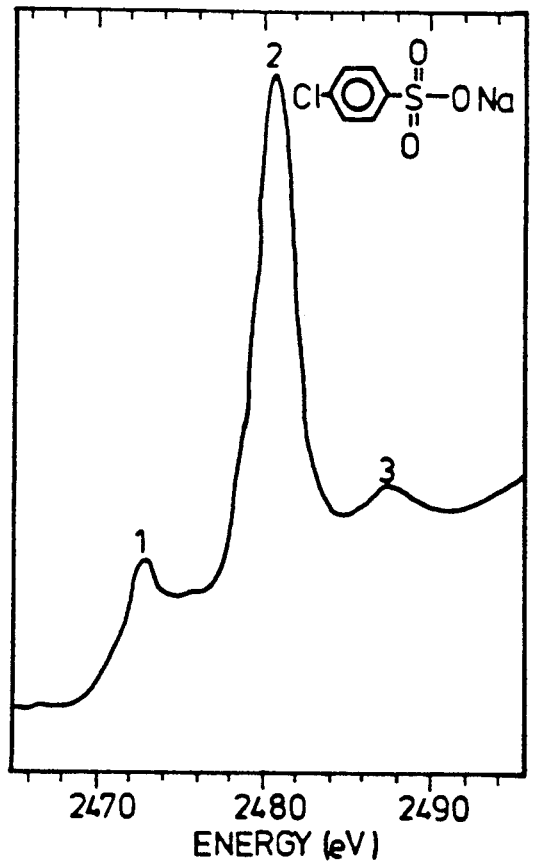
Figure 1D:
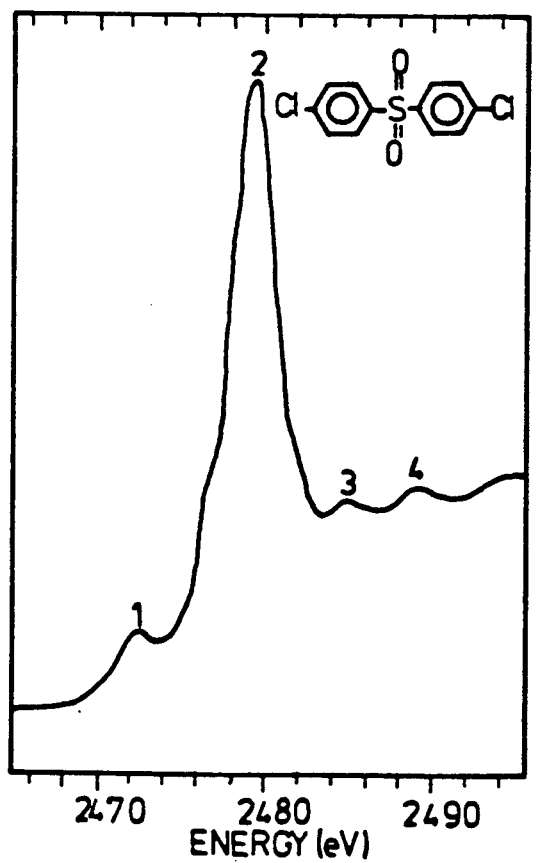
Figure 1E:
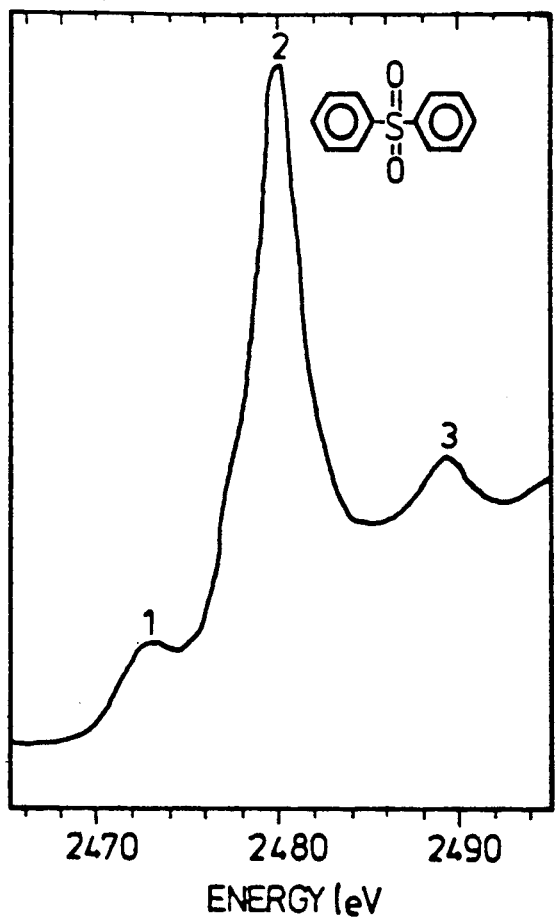
Figure 1F:
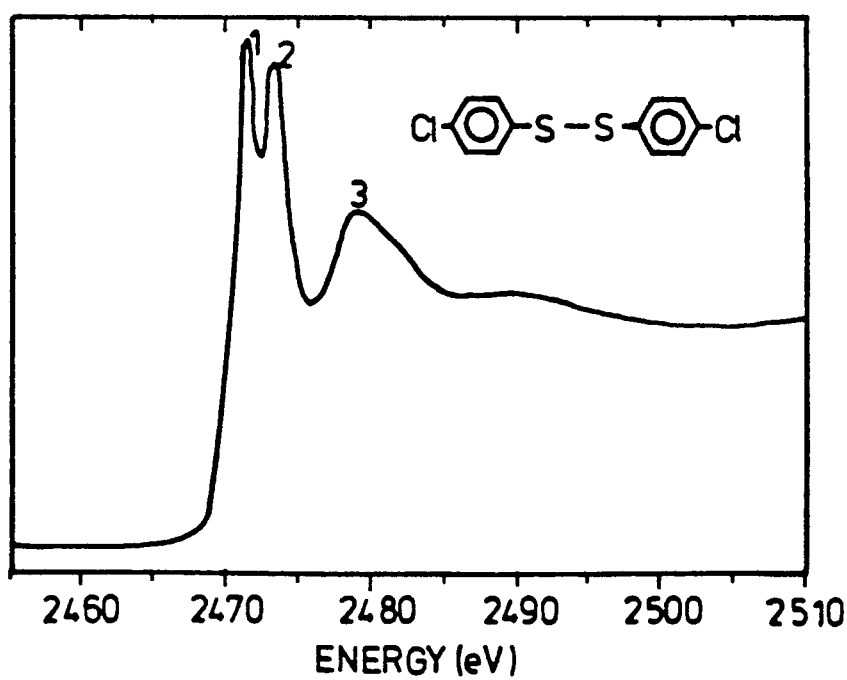
Figure 1G:
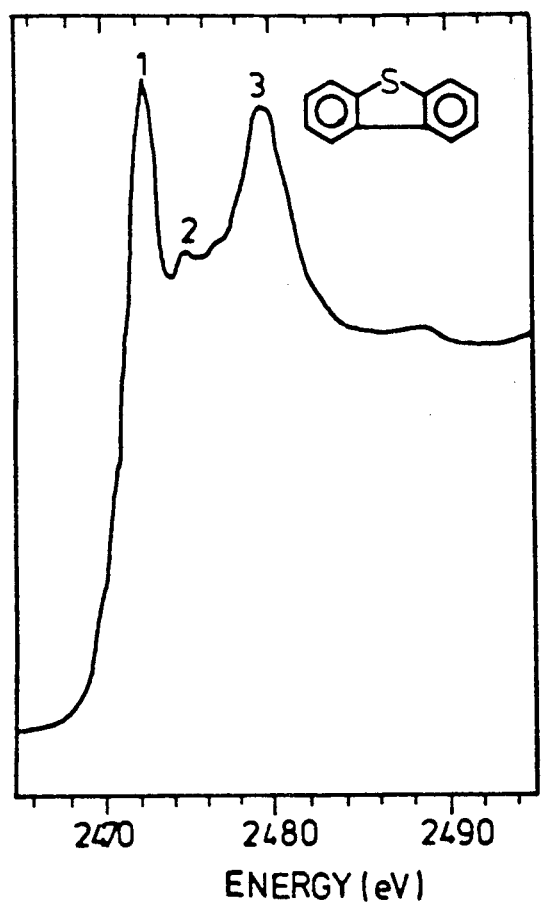
Figure 1H:
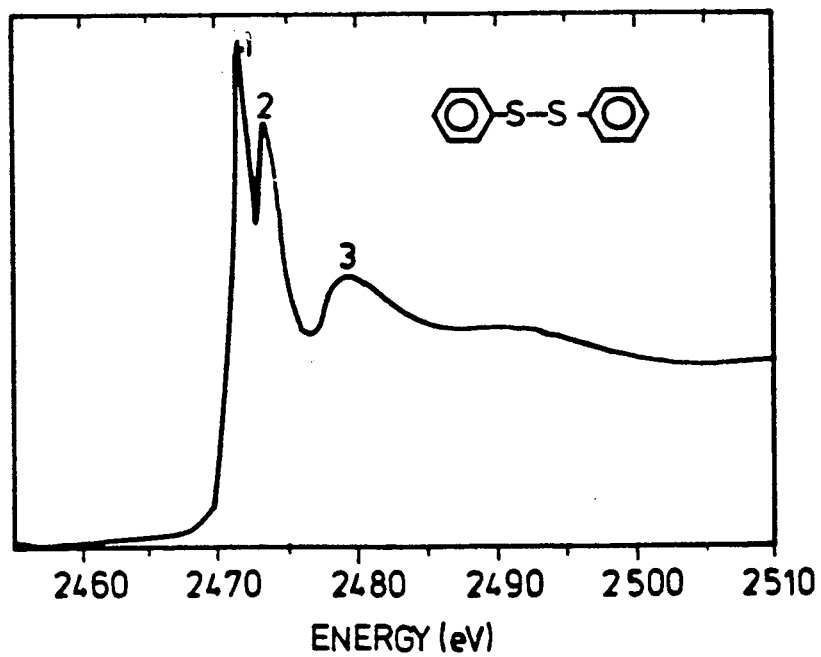
Figure 1I:
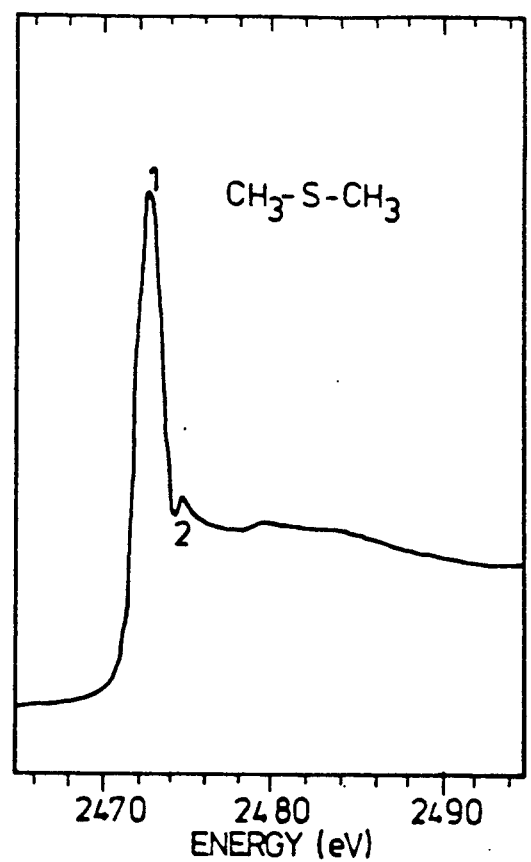
Figure 1J:
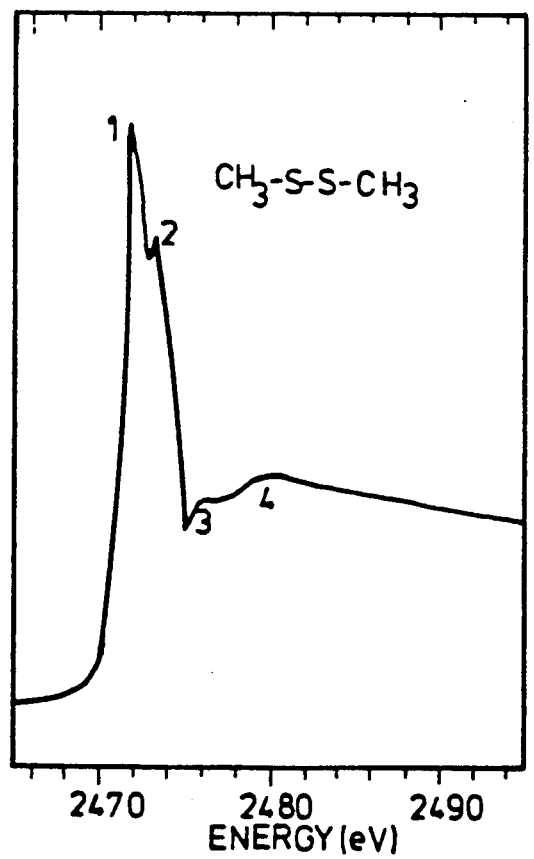
Figure 1K:
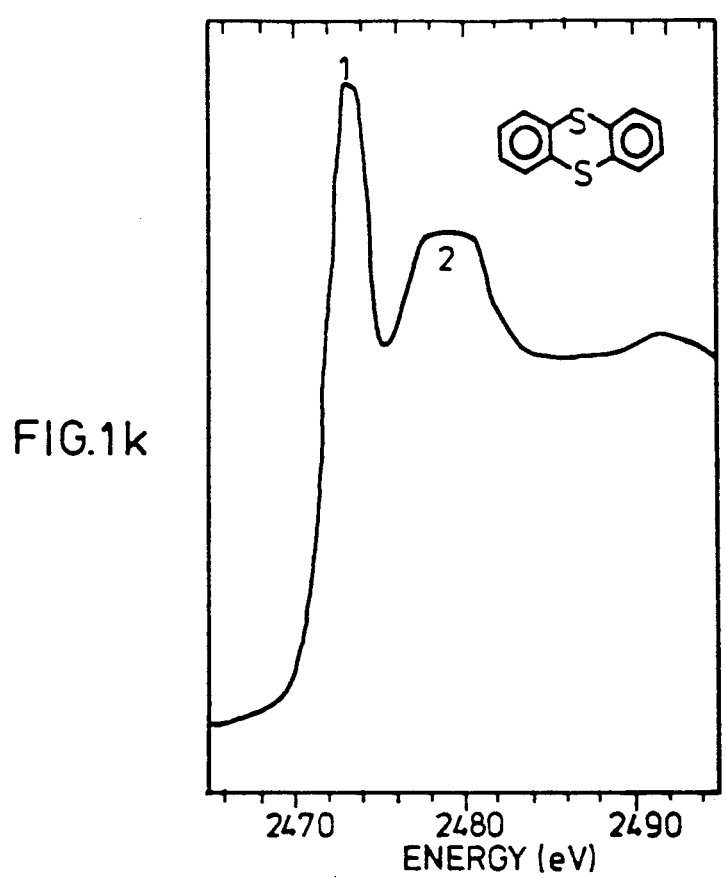
Figure 1L:
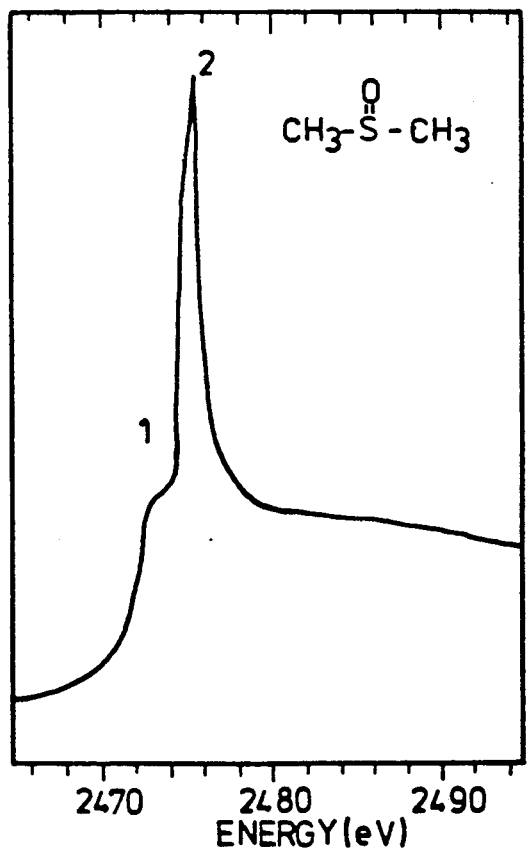
Figure 1M:
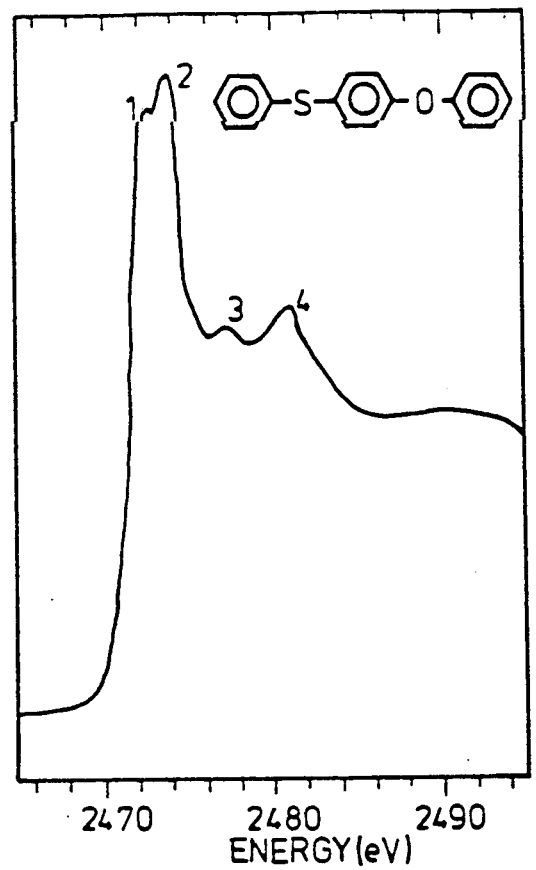

The poly-p-arylene sulfides, preferably poly-p-phenylene sulfides, according to the invention predominantly contain structural elements corresponding to formula

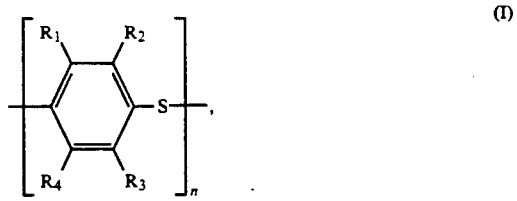

in which $R_1$, $R_2$, $R_3$ and $R_4$ may be the same or different and represent hydrogen (H), $C_1$-$C_{12}$ alkyl, $C_4$-$C_{16}$ cycloalkyl, $C_6$-$C_{20}$ aryl, $C_7$-$C_{30}$ alkaryl and/or aralkyl.

Preferred linear and branched polyarylene sulfides, preferably polyphenylene sulfides, according to the invention are characterized in that, in addition, the melt viscosity $\eta_m$ of from 20 to 500,000 Pa.s and the weight average of the relative molecular weight $M_w$ (rel) of from 25,000 to 380,000 preferably bear the following relation $$\lg \eta_m = 3.48 \cdot \lg M_w (\text{rel}) - 14.25 \pm 0.1,$$

and, more preferably, the following relation $$\lg \eta_m = 3.48 \cdot \lg M_w (\text{rel}) - 14.25 \pm 0.05.$$

The absorption curves of the XANES spectra of the polyarylene sulfides according to the invention show hardly any significant secondary absorption shoulders to the energy ranges a) and b) on the high-energy or low-energy side of the particular absorption maximum. Furthermore the present invention relates to a process A) for the production of the linear and branched poly-p-arylene sulfides, preferably linear and branched polyp-phenylene sulfides, in known manner from aromatic dihalogen compounds corresponding to formula (II)

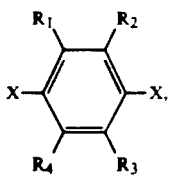

in which $R^1$ to $R^4$ have the same meanings as defined for formula (I), X represents halogen (for example chlorine or bromine) and 0 to 5 mol-%, preferably 0 to 1.25 mol-%, based on the sum of the aromatic dihalogen compounds corresponding to formula (II), of an aromatic trihalogen or tetrahalogen compound corresponding to formula (III)

$$ArX_n \text{ (III)},$$

in which

Ar is an aromatic or hetercyclic $C_6$–$C_{30}$ radical, in which up to 3 ring C atoms may be replaced by heteroatoms, such as N, O, S, X represents halogen, such as bromine or chlorine, and n stands for the numbers 3 or 4, and 0 to 12 mol-%, based on the sum of the aromatic dihalogen compounds corresponding to formula (II), of molecular weight regulators and a sulfur donor, characterized in that (I) the reaction is carried out in an inert gas atmosphere, preferably nitrogen, (II) the reaction is carried out by mixing aqueous sulfur donors with solutions of the aromatic dihalogen compounds in an organic solvent, optionally in the presence of known auxiliaries and/or catalysts, at temperatures above 212° C., the reaction being accompanied by spontaneous elimination of water and the water content of the reaction solution not exceeding 0 to 0.02% by weight water, (III) a mixture of alkali sulfide and alkali hydrogen sulfide is used as the aqueous sulfur donor, from 0.01- to 1 mol alkali hydrogen sulfide being used per mol alkali sulfide, (IV) after addition of the sulfur donor, an excess of aromatic dihalogen compound, preferably an excess of at least 0.1 mol per mol sulfur donor, must be present and is continuously reduced during the reaction to a final value of from 0 to 0.3 mol-% excess aromatic dihalogen compound through separation by distillation.

The present invention relates to another process B) for the production of the poly-p-arylene sulfides, preferably the linear poly-p-phenylene sulfides, in known manner from aromatic dihalogen compounds corresponding to formula (II)

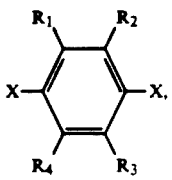

in which $R^1$ to $R^4$ have the meanings defined for formula (I) and X represents halogen, such as chlorine or bromine, and a sulfur donor, characterized in that the reaction is carried out in an inert gas atmosphere, the reaction is carried out by mixing aqueous sulfur donors with solutions of the aromatic dihalogen compounds in an organic solvent, optionally in the presence of known auxiliaries and/or catalysts, at temperatures above 212° C., the reaction being accompanied by spontaneous elimination of water and the water content of the reaction solution not exceeding 0 to 0.02% by weight water, a mixture of alkali sulfide and alkali hydrogen sulfide is used as the aqueous sulfur donor, 0.01 to 0.5 mol alkali hydrogen sulfide being used per mol alkali sulfide, an excess of aromatic dihalogen compound, preferably an excess of at least 0.1 mol aromatic dihalogen compound per mol sulfur donor, is present after addition of the sulfur donor and is continuously reduced during the reaction to a final value of 0 to 0.3 mol-% excess aromatic dihalogen compound through separation by distillation.

The linear and branched poly-p-arylene sulfides, preferably poly-p-phenylene sulfides, according to the invention may be used without oxidative heat curing.

Aromatic dichlorine compounds of formula (II) suitable for use in accordance with the invention for processes A) and B) are, for example, 1,4-dichlorobenzene, 1,4-dibromobenzene, 1-bromo-4-chlorobenzene, 2,5-dichlorotoluene, 2,5-dibromotoluene, 2-chloro-5-bromotoluene, 2,5-dichloro-p-xylene, 2,5-dichloro-m-xylene, 3,6-dichloro-o-xylene.

Preferred alkali sulfides for processes A) and B) are sodium and potassium sulfide. Sulfides produced from the hydrogen sulfides with sodium or potassium hydroxide may be used. They contain from 1 to 9 mol water per mol sulfide. They may be used in the form of a melt.

Preferred hydrogen sulfides for processes A) and B) are sodium and potassium hydrogen sulfide. They may be produced from hydroxides and hydrogen sulfide. They may also be prepared from sulfides using hydrogen sulfide. They may contain from 1 to 9 mol water.

Organic solvents suitable for use in accordance with the invention for processes A) and B) are aprotic solvents, particularly N-alkylated lactams, for example N-ethyl pyrrolidone, N-methyl piperidone, N-isopropyl pyrrolidone, N-methyl caprolactam, N-ethyl caprolactam, ureas, for example disubstituted cyclic ureas, such as N,N'-dimethyl-N,N,-ethylene urea, N,N'-dimethyl-N,N,-propylene urea.

The boiling point of the solvents is in the range from 212 to 280° C. To reach the reaction temperature, the reaction may optionally be carried out under a slight excess pressure of up to 10 bar.

According to the invention, the reaction in processes A) and B) is carried out in an inert gas atmosphere, for example in an atmosphere of nitrogen, a noble gas, such as Ar, etc.

In one particular embodiment, all the starting materials, solvents and auxiliaries and also apparatus used in the reactions may be pretreated with inert gas and freed from reactive gases, for example air.

Suitable molecular weight regulators are known compounds, for example aromatic monochlorine compounds, such as chlorobenzene, phenol(s), phenolates, thiophenol(s), thiophenolate(s), etc. Examples for aromatic trihalogen or tetrahalogen compounds corresponding to formula (III) are 1,2,4,-Trichlorbenzol, 1,3,5-Tribrombenzol, 1,3,5-Tris(4-chlorphenyl)benzol, 1,3,5-Tris(4-bromphenyl)benzol, 2,2'4,4'-Tetrachlordiphenyl, 2,2'4,4'-Tetrachlordiphenylsulfid etc.

Processes A) and B) are carried out by introducing the solvent, the aromatic halogen compounds of formula (II), optionally with auxiliaries, and the aqueous hydrogen sulfides and/or sulfides simultaneously or successively into the reaction mixture. The temperature of the reaction mixture should not fall below 212° C. The removal of water takes place spontaneously with recycling of the aromatic halogen compounds of formula (II) which distill off azeotropically. The water content of the reaction mixture is less than 0.02% by weight (based on aromatic halogen compound).

The reaction time may be varied within wide limits. It may range from less than 1 hour to several days, preferably from 1 hour to 48 hours and more preferably from 2 to 18 hours.

After the aqueous sulfide and hydrogen sulfide solution has been added, the reaction temperature is continuously increased to at most 250° C. The adjusted excess of aromatic dihalogen compound is separated off by distillation during the reaction. For example, for a total reaction time of 10 hours, up to 40% of the excess aromatic dihalogen compound are removed from the reaction mixture after 5 hours, up to 80% after another 3 hours and up to 100% after another 2 hours. If sulfur is removed from the reaction by outgassing, for example of hydrogen sulfide, this should be taken into account, for example in calculation of the stoichiometry. The hydrogen sulfide escaping may be returned, for example, for the production of alkali sulfide.

The polyarylene sulfides are isolated in known manner, for example by cooling, filtering and washing of the reaction mixture with ketones, such as acetone, etc., or alcohols, such as methanol, ethanol, isopropanol, etc. The residue remaining is suspended in water in a ratio of 1 part residue to 5 to 20 parts water, the suspension is adjusted to pH 1–5 with acids such as acetic acid, hydrochloric acid, phosphoric acid, sulfuric acid, etc., and then washed with water until neutral. The high molecular weight polyarylene sulfides thus obtained show high chemical uniformity.

The melt viscosities ($\eta_m$) and the weight average of the relative molecular weight $M_w$ (rel) of the polymers according to the invention as a measure of their molecular weight may be determined, for example, by the method described in EP-A 142 024, EP-A 171 021 and in DE-A 3 622 194.

In order to prove the chemical uniformity of the poly-p-arylene sulfides according to the invention, the XANES spectra of the poly-p-arylene sulfides described in Examples 1 and 2 were investigated. In the energy range between 2470 eV and 2490 eV, they have only two absorption maxima (cf. Table III).

The linear and branched poly-p-arylene sulfides according to the invention have only two absorption maxima in the XANES spectrum in the same way as the model compound with no defect or foreign structures. To prove that the polymers are free from defect structures, the energy position of the absorption maxima at the K edge of the sulfur should also be taken into account.

By establishing the difference between the spectra standardized to the absorption line of highest intensity in the energy range between 2470 and 2490 eV, it is possible to determine whether or not a XANES spectrum contains indications of defect structures in the polymer. To this end, the following procedure is adopted: the standardized XANES spectrum of the substance to be investigated for the defect structures is subtracted from the standardized spectrum of the substance free from defect structures. In view of the resolution of ±0.1 eV of the apparatus used, these differential spectra are significant indicators for polyarylene sulfides substantially free from defect structures.

Comparison of the spectra in FIGS. 1 with those of the Examples according to the invention on the basis of the energy positions (Table I and III) shows that the polymers according to the invention have no detectable defect structures.

The linear and branched poly-p-arylene sulfides according to the invention are new. The XANES spectrum of the new poly-p-arylene sulfides is different from the XANES spectra of the known polyarylene sulfides.

XANES spectra of the Comparison Examples of Table IV were recorded and standardized to the white line. These standardized spectra were subtracted from the spectrum of Example 1 according to the invention. The differential spectra are shown in FIGS. 4 (a to g).

Since the spectra of Examples 1 and 2 are only marginally different, substantially the same differential spectra are obtained if the difference between the comparison polyarylene sulfides and Example 2 is formed. The negative difference in the energy range between 2470 and 2474 eV shows that the comparison polyarylene sulfides have secondary structures on the low-energy side of the white line. They are recognizable as secondary maxima adjacent the absorption line of greatest intensity. Positive and/or negative differences above 2474 eV indicate a shift in the energy position of the white line, a change in the absorption range and further secondary absorption maxima above 2474 eV. Polyarylene sulfides, which show such differences from the poly-p-arylene sulfides according to the invention, contain defect structures or foreign structures.

The new polyarylene sulfides show hardly any troublesome outgassing during processing, for example by injection molding at elevated temperature. Accordingly, they may be processed, for example, without elaborate safety precautions (odor!). In addition, they are suitable, for example, for the production of injection-molded articles of complicated shape without, for example, the highly polished surfaces of the injection mold being affected, even after large numbers of cycles.

The polymers according to the invention may be used in known manner for the production of molded articles, for example (blown) extrudates, for the production of fibers, films, pipes, profiles, injection-molded articles, components for the electrical and electronics industry, etc.

The polymers may optionally be blended in known manner with standard fillers and reinforcing materials, other polymers and additives.

They may be used in known manner, for example as automotive components, fittings, valves, ball bearing components, electrical components, for example switches, circuit boards, components and apparatus resistant to chemicals and weathering, such as pump housings and pump flywheels, etching baths, sealing rings, parts of office machines, communications equipment, domestic appliances, etc.

EXAMPLE 1 A

Production of branched poly-p-phenylene sulfide by process A 2700 g N-methyl caprolactam, 584.0 g 1,4-dichlorobenzene and 51.1 g 1,3,5-tris-(4-chlorophenyl)-benzene are introduced under nitrogen into a 5-liter tank reactor and heated at 215° C. A solution of 600.3 g sodium sulfide, 69.9 g sodium hydrogen sulfide, 191.2 g sodium aminocaproate, 158.0 g sodium phenolate and 752 g water is then added over a period of 4 hours. At the same time, another 892.8 g 1,4-dichlorobenzene are continuously added. During the addition from both inflows, water is azeotropically removed from the mixture with stirring at a temperature of 213 to 217.C, the 1,4-dichlorobenzene distilled off with the water being continuously fed into the reactor. After the sulfur donor has been added, the temperature is increased. The mixture is then heated under reflux for another 10 hours (final temperature 241° C.). Small quantities of distillate are continuously removed through a distillate divider. After 10 hours, the total amount of distillate amounted to 247.9 g 1,4-dichlorobenzene and 354.3 g N-methyl caprolactam. To maintain the liquid level, the loss of liquid was made up by addition of 500 ml N-methyl caprolactam. During the reaction, a total of 20.8 g hydrogen sulfide escapes from the reaction system. The reaction mixture is precipitated with stirring in 7000 g isopropanol. Salt and polymer are filtered off, washed with 3000 g isopropanol, the residue is suspended in 3000 g water and the resulting suspension is acidified with concentrated hydrochloric acid to pH 2. The polymer is then filtered off, washed with water and dried in vacuo at 100° C. 886.3 g (=89.7%) of a polymer having a melt viscosity of 980 Pa.s (T =306° C., shear rate =100 Pa); $M_2$ (rel) =64,137 are obtained. For determination of the chemical uniformity, see Tables III and V.

COMPARISON EXAMPLE 1 A

Production of polyphenylene sulfide in accordance with US-PS 3,345,129 with addition of branching agent 129 g sodium sulfide trihydrate (=1 mol sodium sulfide) and 300 g N-methyl pyrrolidone were combined in a stirrer-equipped autoclave. The mixture was purged with nitrogen and slowly heated to 202° C., a total of 19 ml water distilling off (giving a residual water content of 1.78 mol, based on sodium sulfide, in the reaction solution). The mixture was then cooled to approximately 160° C. and 147 g 1,4-dichlorobenzene (=1 mol) and 1.81 g 1,2,4-trichlorobenzene (1 mol-%) in approximately 50 g methyl pyrrolidone were added. The reaction mixture is heated in 30 minutes to 245° C. under a nitrogen pressure of 2.5 bar and kept at that temperature for 3 hours. A final pressure of 14.5 bar is reached. After cooling to room temperature, a grey solid is isolated and is subsequently washed with water. Drying in vacuo at 80.C gives 100.3 g (=93%) poly-p-phenylene sulfide light brown in color with a melt viscosity of 20 Pa.s (T =306.C, D =100 Pa). The polymer cannot be processed without hardening. For determination of the chemical uniformity, see Tables IV and V.

COMPARISON EXAMPLE 2 A

Production of branched polyphenylene sulfide in accordance with EP-PS 142 024 (Example 2)

1110 g N-methyl caprolactam, 30.3 g N,N-dimethylacetamide, 341.1 g 1,4-dichlorobenzene (=2.23 mol) and 2.73 g 1,2,4-trichlorobenzene (0.65 mol-%, based on 1,4-dichlorobenzene) are introduced under nitrogen into a 2-liter three-necked flask equipped with a thermometer, stirrer, coolable column, distillate divider and reflux condenser and heated to a temperature of 190° C. to 200° C. A solution of 180.9 g sodium sulfide (=2.32 mol S donor) and sodium hydroxide in a total of 250 ml water (including water of hydration) is then added dropwise at such a rate that the water added can distill off substantially simultaneously with 1,4-dichlorobenzene. To maintain stoichiometry, the 1,4-dichlorobenzene distilled off is returned to the reaction mixture after separation of the water. On completion of the addition and on completion of dehydration, the column is switched to cooling, the reaction mixture is heated under reflux for 10 hours and the product is subsequently isolated in the usual way. A white polyarylene sulfide having a melt viscosity of 120 Pa.s (T =306° C., D =1000/sec) is obtained in a yield of 225.9 g (90.2%, based on 1,4-dichlorobenzene). For determination of the chemical uniformity, see Tables IV and V.

COMPARISON EXAMPLE 3 A

Production of branched polyphenylene sulfide in accordance with U.S. Pat. No. 4 286 018, Example 10

Starting materials 1.02 mol 1,4-dichlorobenzene
1.00 mol $Na_2S \cdot 9H_2O$
0.90 mol $Li(OAc) \cdot 2H_2O$
0.14 mol NaOH
0.005 mol 1,3,5-tris-(4-chlorophenyl)-benzene
4.00 ml N-methyl pyrrolidone.

Procedure: as in Comparison Example 1 A, except that the reaction is kept at 270° C. for 6 hours.

98.5 g (=91.2%) polymer having a melt viscosity of 390 Pa.s (T =306.C, D =100 Pa) were obtained.

For determination of the chemical uniformity, see Tables IV and V.

TABLE 1B

Production of linear poly-p-phenylene sulfide by process B 2700 g N-methyl caprolactam and 611.5 g 1,4-dichlorobenzene are introduced under nitrogen into a 5 liter tank reactor and heated to 215° C. A solution of 600.3 g sodium sulfide, 69.9 g sodium hydrogen sulfide, 191.2 g sodium aminocaproate and 752 g water is then introduced over a period of 4 hours. At the same time, another 856.1 g of 1,4-dichlorobenzene are continuously added. During the addition from both inflows, the reaction mixture is azeotropically freed from water while stirring at a reaction temperature of 213 to 217.C, the 1,4-dichlorobenzene distilling off with the water being continuously returned to the reactor. After addition of the sulfur donor, the temperature is increased. The reaction mixture is then heated under reflux for another 10 hours (final temperature 241° C.). Small quantities of distillate are continuously removed through a distillate divider. After 10 hours, the total amount of distillate amounted to 247.1 g 1,4-di-chlorobenzene and 311.7 g N-methyl caprolactam. To maintain the liquid level, the loss of liquid was made up by addition of 500 ml N-methyl caprolactam. During the reaction, a total of 22.5 g hydrogen sulfide escapes from the reaction system. The reaction mixture is precipitated while stirring in 7000 g isopropanol, salt and polymer are filtered off, washed with 3000 g isopropanol, the residue is suspended in 3000 g water and the resulting suspension is acidified with concentrated hydrochloric acid to pH 2. The polymer is then filtered off, washed with water and dried in vacuo at 100° C. A polymer having a melt viscosity of 274 Pa.s (T = 306.C, shear rate D = 1000/sec); weight average of (rel) = 61082 is obtained in a yield of 824 g (=91.7%). For determination of the chemical uniformity, see Tables III and V.

EXAMPLE 2 B 1340.2 g N-methyl caprolactam and 360.15 g 1,4-dichlorobenzene are introduced into a 4 liter tank reactor under a nitrogen excess pressure of 50 mbar and heated to 215° C. A solution of 215.3 g sodium sulfide and 80.6 g sodium hydrogen sulfide in 321.4 g water is introduced with stirring over a period of 4 hours at a reaction temperature of 218 to 222° C., the water being spontaneously removed by azeotropic distillation. The 1,4-dichlorobenzene distilling off with the water is continuously returned to the reaction mixture and, 3 hours after the beginning of the addition, 205.8 g 1,4-dichlorobenzene are introduced simultaneously with the sodium sulfide/hydrogen sulfide solution. Samples of the reaction mixture are dissolved in anhydrous methylene chloride after 1, 2, 3 and 4 hours and their water content determined. The water content in all samples is at most 0.01% by weight. The temperature of the reaction mixture is increased to 230.C over a period of 30 minutes, after which the reaction mixture is refluxed for another 8 hours, a total of 211 ml N-methyl caprolactam and 51.5 g 1,4-dichlorobenzene being distilled off. The final temperature of the reaction mixture is 242° C. The total quantity of hydrogen sulfide escaping is 24.1 g. The polymer is isolated in the same way as described in Example 1 and 349.2 g (=92.4%) of polymer having a melt viscosity of 202 Pa.s (T = 306.C, shear rate d = 1000/sec) and a weight average of $M_w$(rel) 57519 are obtained. For determination of the chemical uniformity, see Table III and V.

COMPARSION EXAMPLE 1 B

Production of linear polyphenylene sulfide in accordance with US-PS 3,354,129

129 g sodium sulfide trihydrate (=1 mol sodium sulfide) and 300 g N-methyl pyrrolidone were combined in a stirrer-equipped autoclave. The mixture was purged with nitrogen and slowly heated to 202° C., a total of 10 ml water distilling off (giving a residual water content of 1.78 mol, based on sodium sulfide, in the reaction solution). The mixture was then cooled to approximately 160° C. and 147 g 1,4-dichlorobenzene (=1 mol) in approximately 50 g methyl pyrrolidone were added. The reaction mixture is heated in 30 minutes to 245° C. under a nitrogen pressure of 2.5 bar and kept at that temperature for 3 hours. A final pressure of 14.5 bar is reached. After cooling to room temperature, a grey solid is isolated and is subsequently washed with water. Drying in vacuo at 80° C. gives 100.3 g (=93%) poly-p-phenylene sulfide light brown in color with a melt viscosity of 4.5 Pa.s (T = 306° C., D = 1000/sec.).

The polymer cannot be processed without hardening. For determination of the chemical uniformity, see Tables IV and V.

COMPARISON EXAMPLE 2 B

Production of linear polyphenylene sulfide in accordance with Example 1, page 71, of EP-A 171 021

1110 g N-methyl caprolactam, 323.5 g sodium sulfide hydrate (=2.45 mol $Na_2S$), 2.4 g 50% sodium hydroxide, 341.1 g 1,4-dichlorobenzene (=2.32 mol), 28.53 g sodium acetate and 5.07 g ⊖-aminocaproic acid (0.035 mol) are introduced under nitrogen into a 2 liter three-necked flask equipped with a thermometer, stirrer and column with distillate divider. The reaction mixture is slowly heated to the boiling temperature. Water is separated off from the distilling azeotrope consisting of water and p-dichlorobenzene and p-dichlorobenzene is returned to the reaction vessel. After 2 hours, no more water can be detected either in the distillate or in the sump. After refluxing for another 9 hours, the product is isolated in the form of a white fiber by precipitation in water, acidification, washing with water until free from electrolyte and drying. It is characterized by determination of the melt viscosity $\eta = 3.6 \times 10^2$ (as measured at $10^2$ Pa/306° C.) and the relative molecular weight $M_2 = 68,000$. For characterization of the chemical uniformity, see Tables IV and V.

COMPARISON EXAMPLE 3 B

Production of linear polyphenylene sulfide in accordance with EP-A 226 998, Example 1

A 2-liter autoclave is filled with 1000 g N-methyl-2-pyrrolidone, 258.2 g sodium sulfide flakes containing 60.44% by weight sodium sulfide, 299.9 g 1,4-dichlorobenzene and 8 g sodium hydroxide. The temperature is increased with stirring to 220° C. in a nitrogen atmosphere and maintained for 10 hours. The reaction mixture is then cooled to room temperature. 90 g water and 2 g sodium hydroxide are added to the mixture. The mixture is then heated and kept at 260° C. for 5 hours. After cooling, the mixture is filtered. The granular polymer remaining behind is washed repeatedly with deionized water. 168.5 g (=78% yield) of polymer having a melt viscosity of 600 Pa.s (T = 306° C., D = 1000/sec.) were obtained. For characterization of the chemical uniformity, see Tables IV and V.

Determination of defects and defect structures by the XANES method

Defects in poly-p-arylene sulfide may be, for example, (partially) oxidized sulfur units, such as sulfoxides or sulfones (cf. for example U.S. Pat. No. 4,251,575, DE-A 1 938 806 or R. Gabler, J. Studinka, Chimia 28 (1974), pages 567 et seq), branches or crosslinks through aftertreatments (for example EP-PS 91 008), (reactive) terminal groups which may have been formed, for example, by secondary reactions, such as hydrolysis, oxidation or the attack of an auxiliary or an impurity in the starting materials, disulfide or polysulfide units (B. Hortling, J.J. Lindberg, Makromol, Chem. 179 (1978), page 1707; B. Hortling, ibid. 178 (1977), page 2185), ether bridges, polyaromatic compounds, such as for example diphenyl or terphenyl groups, position-isomeric units, such as ortho- or meta-substituted aromatics and/or thiophene or thianthrene units (J.W. Cleary, Polymer Preprints 25 (1984), page 36).

In principle, defect structures in polymers can be detected by standard analytical techniques, such as IR, UV, NMR spectroscopy, or chemical analytical techniques, etc. Certain defect structures may be detected by the ESCA method (cf. for example A. Kaul, American Chemical Society, Division of Polymer Chemistry, Polymer Preprints 28 (1987), pages 229 to 231). Very small levels of these defect structures could be detected, for example, by X-ray absorption spectroscopy.

To determine whether defect structures are present in poly-p-arylene sulfides, an X-ray absorption spectrum of the corresponding substance is recorded in the vicinity of the sulfur-ls-edge. These near-edge spectra are called XANES spectra (X-ray absorption near edge structure). They are sensitive to the chemical environment of the excited atom (cf. for example J.B. Pendry, Comments on Solid State Physics, Vol. 10, pages 219 et seq (Vol. 1983)). The XANES spectra contain information on the first, second and, possibly, even the third coordination sphere of the up atom (=the atom at whose K edge the measurement is made), in the case of PAS the sulfur atom.

Structures in the absorption spectrum below the ionization limit, which belong to transitions into bound molecule orbitals ("white lines"), and the structures in the absorption coefficient above the ionization limit which are caused by multiple scattering of the issuing electron are used in the analysis.

The spectra are recorded, for example, by a vacuum double crystal X-ray monochromator (cf. for example Lemonier, M., Collet, 0., Depautex, C., Estava, J.M. and Raoult, D. (1978), Nucl. Instrum. Methods, Vol. 152, pages 108 et seq). The crystals used may be, for example, indium-antimony (In/Sb (1,1,1) crystals, high-quality rock crystals, silicon-1,1,1-crystals, germanium-1,1,1-crystals. Absolute calibration of the energy may be done, for example, against the known white line of argon. It lies at 3203.54 eV (cf. M. Breinig et al. Phys. Rev. A, Vol. 22 (1980), pages 520 et seq, more especially page 520, right-hand column, top: accuracy better than 0.1 eV, and page 525: energy position of the white line of argon).

The energy position of the measured spectra is determined using a calibrated sample of a model substance in which sulfur for example is incorporated in defined form. Thus, it is possible to achieve an absolute and relative accuracy of ±0.1 eV. The resolving power of the monochromator corresponds for example to the life of the sulfur-ls-hole.

For the detection of defect or foreign structures in poly-p-arylene sulfides, preferably polyphenylene sulfides, the measurements are carried out in transmission on the polymers. Polymers obtained direct from polymerization, i.e. without any aftertreatment, are preferably used. They may already have been processed, for example to films. Surface effects which can occur on test specimens are negligible. The thickness of the test specimens is selected so as to avoid saturation effects in the spectrum. The measurements are carried out in the absence of UV light.

After the spectra have been recorded, they are corrected in known manner, for example to average out effects of higher electron shells in the atom under observation. The spectra are then standardized to the intensity of the white line, the band with the highest absorption coefficient being used for this purpose. The difference between spectra is formed by subtracting the standardized spectra of the individual samples.

The measurements are carried out with an intensive X-ray continuum. This is supplied, for example, by high-performance rotating anodes. For example, the sources desin Internal Report UUIP-817, Apr. 1973, UPPSALA University Institute of Physics under: "U. Gelius, E. Basilier, S. Svensson, T. Bergmark and K. Siegbahn: A High Resolution ESCA Instrument with X-Ray Monochromator for Gases and Solids" and, optionally, the sources described in Internal Report UUIP-1128, Oct. 1984 under "K. Siegbahn: Electron Spectroscopy for Atoms, Molecules and Condensed Matter - An Overview" may be used as the X-ray sources. Suitable synchrotron radiation sources or storage rings may also be used.

X-ray absorption spectroscopy in the XANES region is also capable of detecting defect or foreign structures in poly-p-arylene sulfides.

Figure 1N:
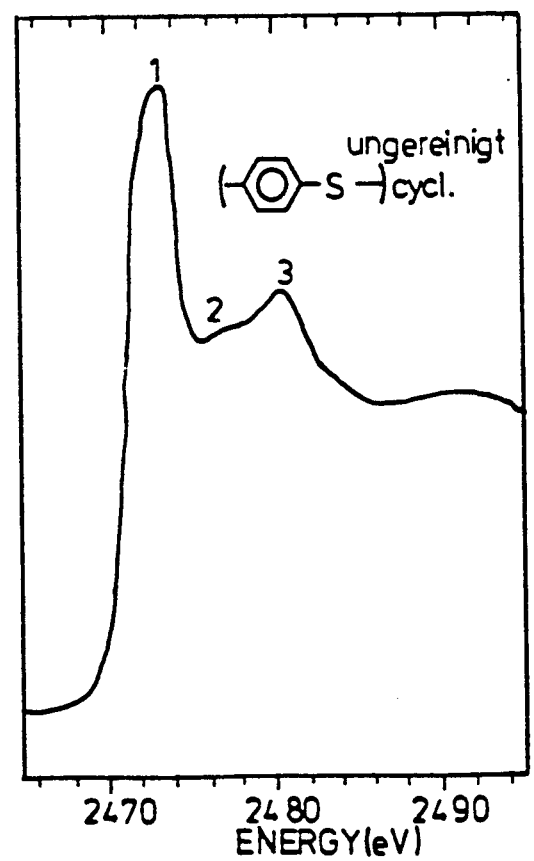
Figure 2A:
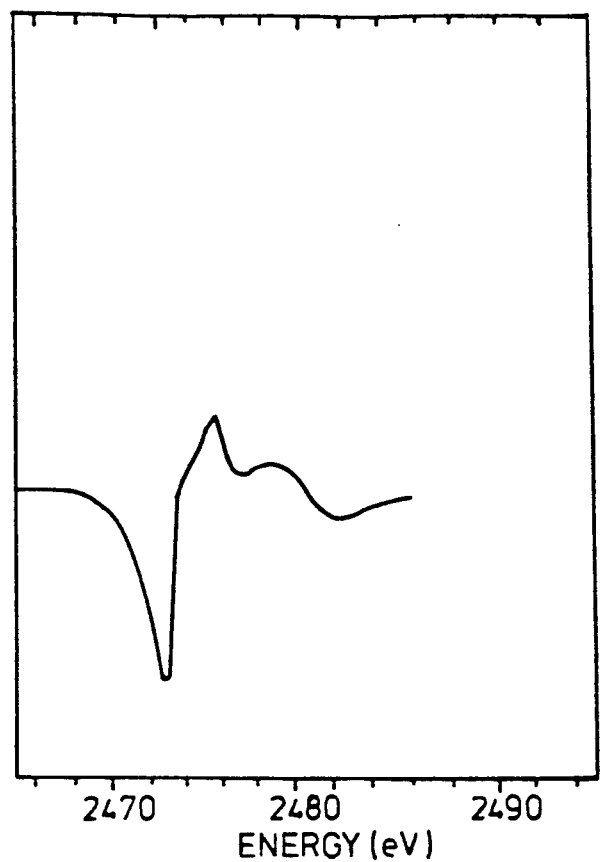
FIGS. 2(a) - 2(i) represent, in graph form, the difference between the standardized XANES spectra of the materials indicated in Table IV and the standardized spectra of Example 1B.
Figure 2B:
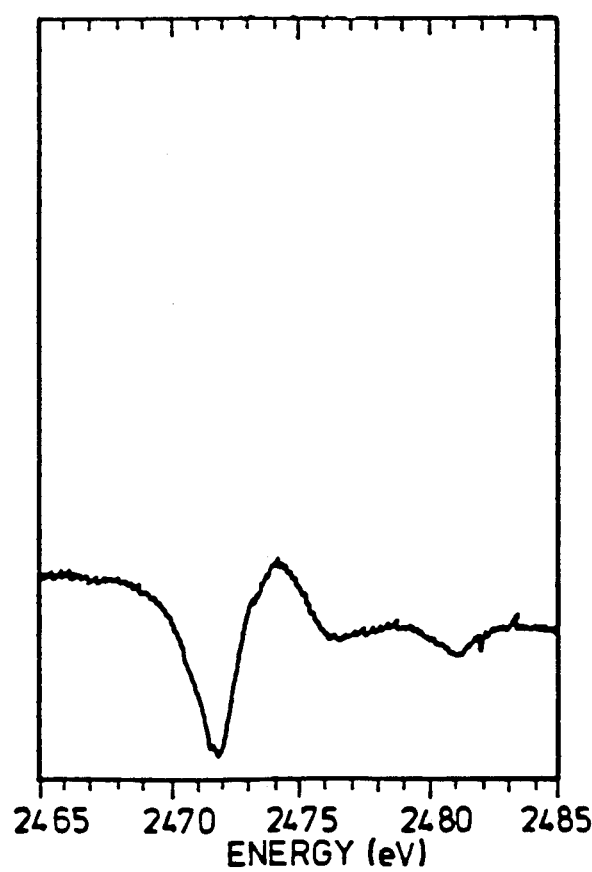
Figure 2C:
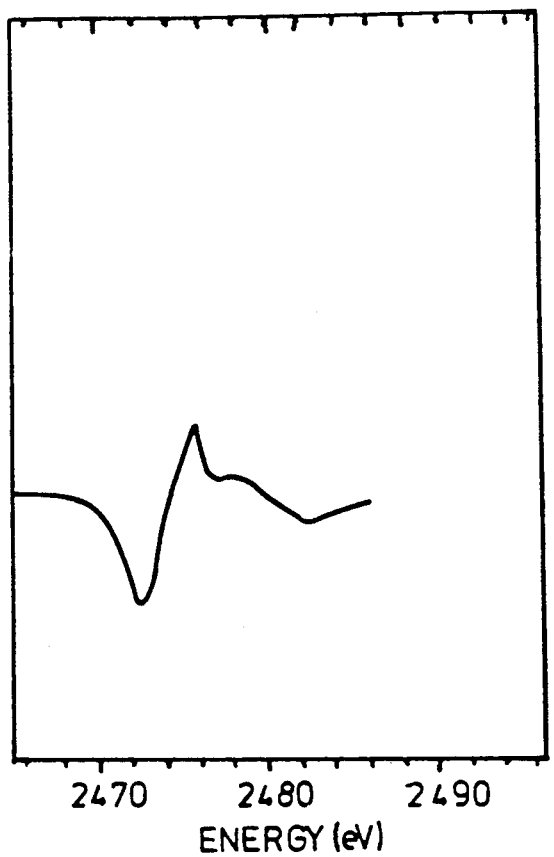
Figure 2D:
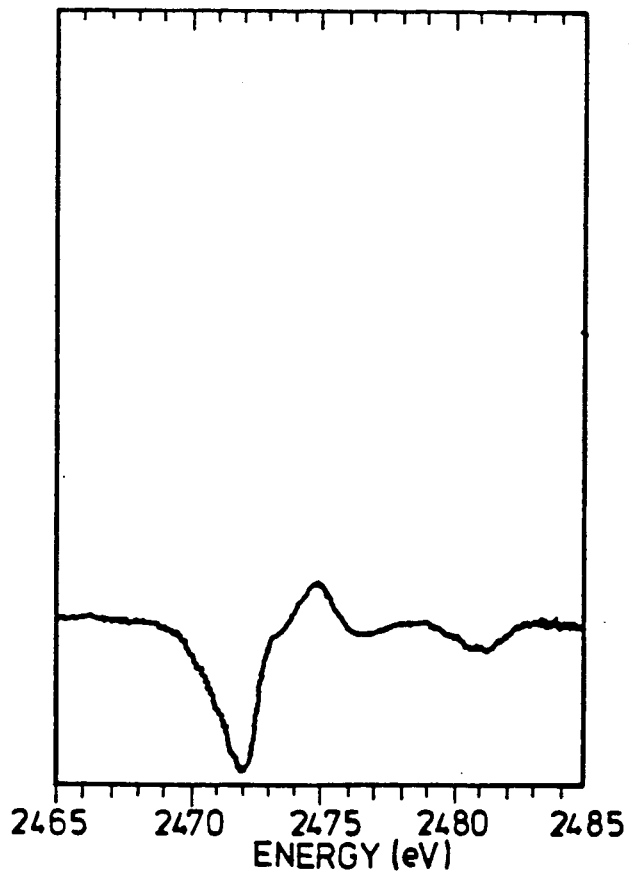
Figure 2E:
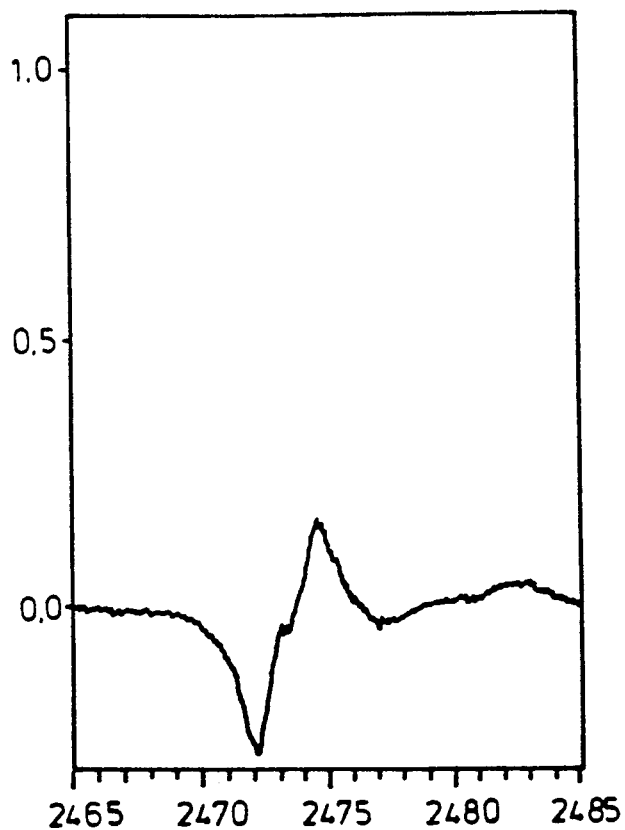
Figure 2F:
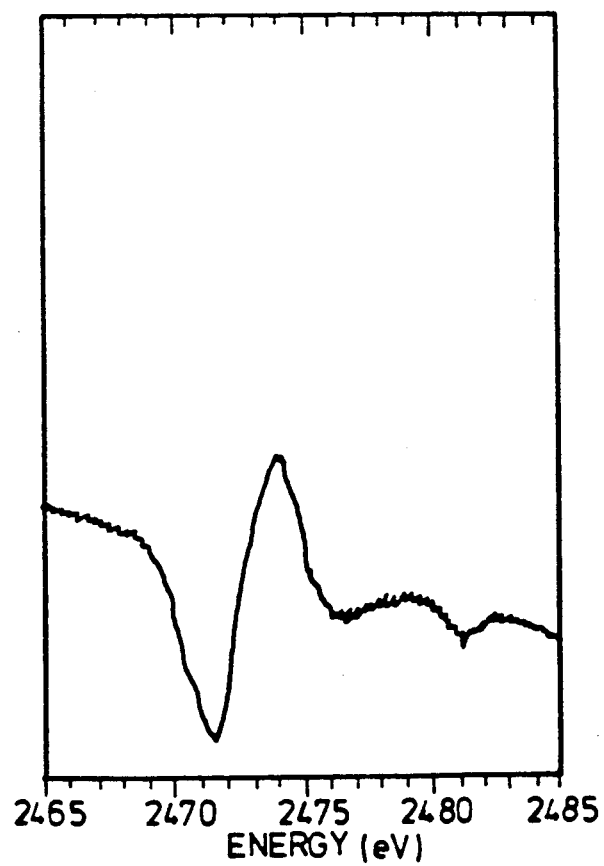
Figure 2G:
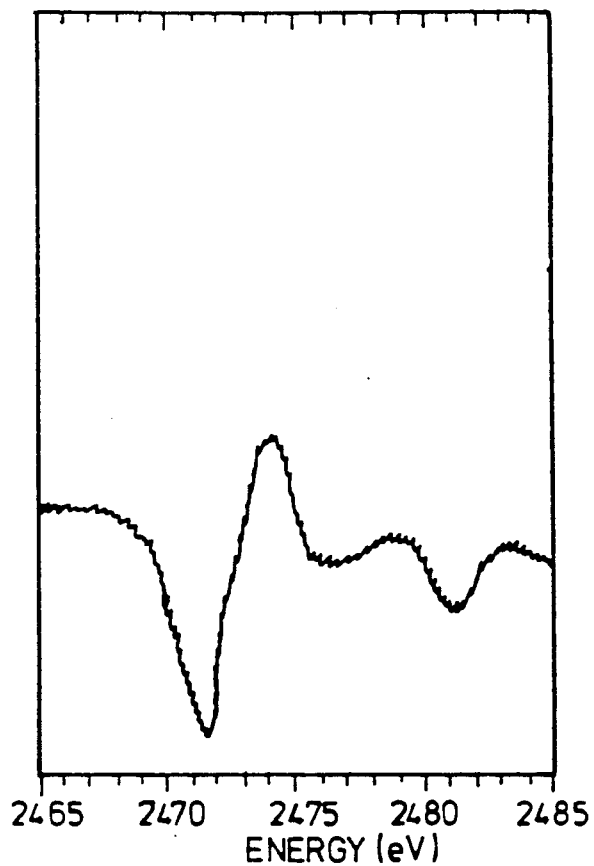
Figure 2H:
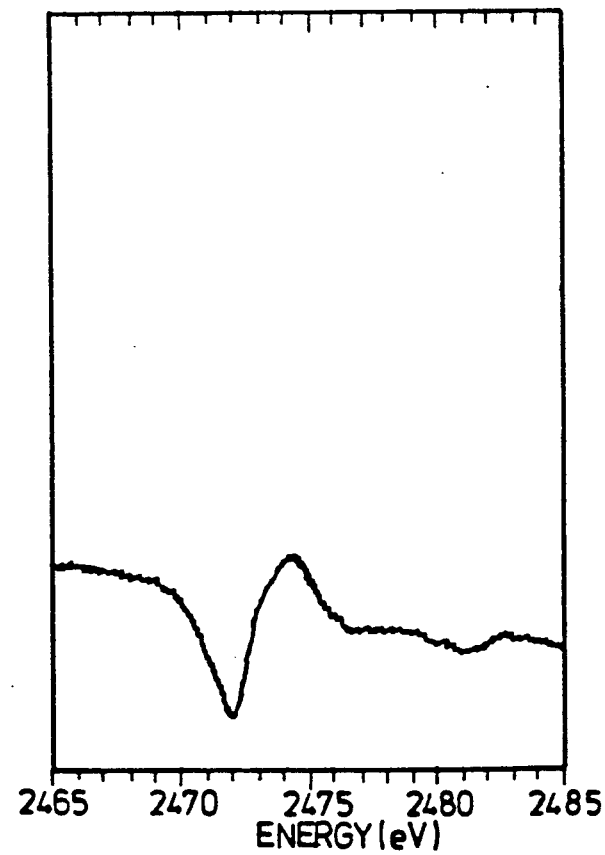
Figure 2I:
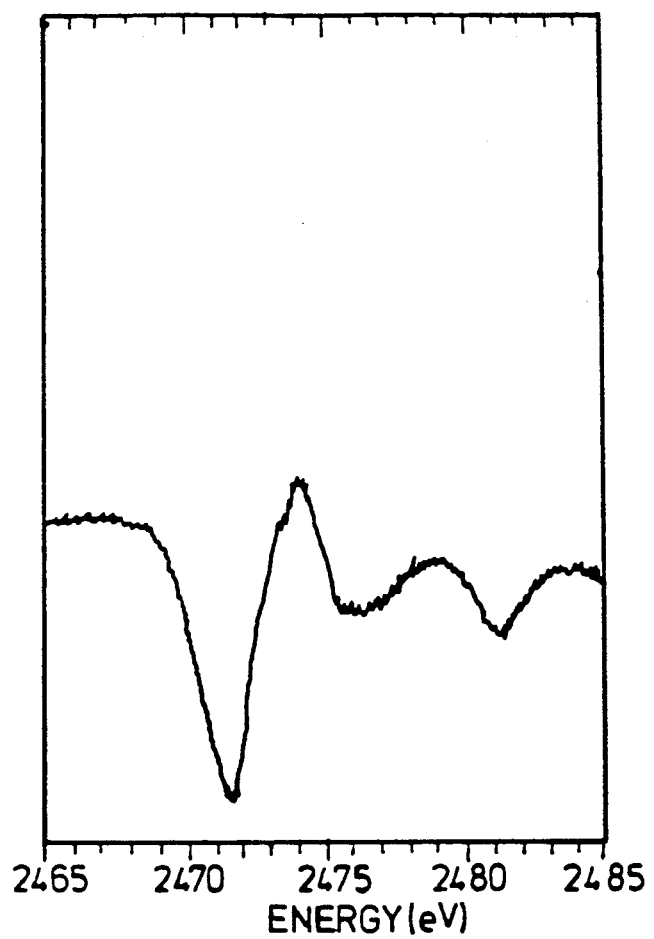

A number of pure compounds which are shown in Table 1 may serve as model systems for such defect or foreign structures. The XANES spectra of these model compounds were recorded in the manner already described. The background-corrected spectra (effect of the higher shells) were standardized in the described manner and are shown in FIGS. 1(a) to 1(n). The numbers of absorption peaks shown in the drawings, which accumulate directly in the XANES spectrum without deconvolution, i.e. splitting up into individual absorption lines which are measured superimposed in the XANES spectrum, are shown in Table 1 with the corresponding energy positions in brackets (figures in eV).

Compounds 1(a) to 1(n) are known. Compound 1(n) is obtained, for example, by the cycle extraction process (cf. for example Tetrahedron Letters 23, (1982), page 373). The cycles were not freed from oligomeric linear or other structures.

It can be seen from the FIGS. and the energy positions that the structuring of the XANES spectrum is very substantial. In energy terms, all the absorption maxima are resolved with an accuracy of ±0.1 eV.

The XANES spectrum of, for example, a purified cyclic compound may be taken as an example of a XANES spectrum of a model compound with no defect structures (cf. for example Tetrahedron Letters 23 (1982), page 373; Struct. Comm. 11 (1982), page 1751). The XANES characterization of this compound in Table II shows that only two shoulderless absorption maxima occur in the energy range between 2470 and 2490 eV. The other absorption lines, which are indicative of the presence of defect structures are not to be found. In this way, it is possible by the XANES method to decide for any sulfide-containing compound whether or not the compound contains defect structures of the type mentioned above.

TABLE I

Some of the possible defect structures and characterization of the XANES spectra. The corresponding standardized XANES spectra are shown in FIGS. 1.a) to 1.n). The local absorption maxima of these spectra are shown with an increasing energy position for each defect structure and are marked in the spectra of the Figures (numbers).

| No. of FIG. | Structural formula | Local absorption maxima (all figures in eV) |
|---|---|---|
| 1. (a) | 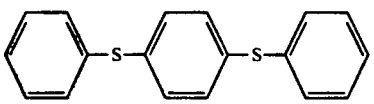 | 2472.72 (1), 2473.72 (2) 2477.27 (3), 2481.4 (4) |
| 1. (b) | 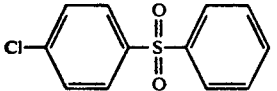 | 2472.91 (1), 2479.72 (2) 2489.16 (3) |
| 1. (c) | 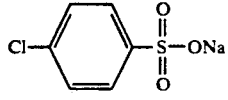 | 2472.96 (1), 2480.59 (2) 2487.65 (3) |
| 1. (d) | 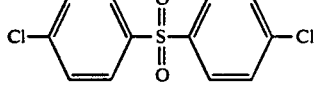 | 2472.64 (1), 2479.40 (2) 2485.40 (3), 2488.90 (4) |
| 1. (e) | 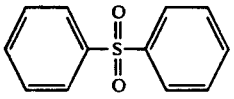 | 2473.00 (1), 2479.91 (2) 2489.64 (3) |
| 1. (f) | 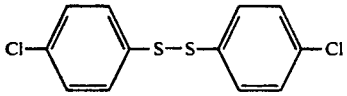 | 2471.36 (1), 2473.24 (2) 2479.1 (3) |
| 1. (g) | 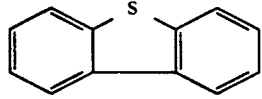 | 2472.44 (1), 2475.32 (2) 2479.50 (3) |
| 1. (h) | 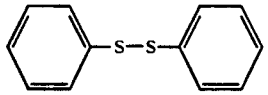 | 2471.56 (1), 2473.38 (2) 2479.3 (3) |
| 1. (i) | $CH_3-S-CH_3$ | 2472.61 (1), 2474.87 (2) |
| 1. (j) | $CH_3-S-S-CH_3$ | 2471.90 (1), 2473.15 (2) 2476.2 (3), 2480.0 (4) |
| 1. (k) | 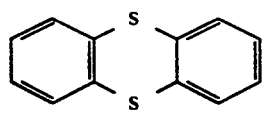 | 2473.22 (1), 2479.00 (2) (broad plateau) |
| 1. (l) | $\begin{array}{c}CH_3-S-CH_3\\\|\\O\end{array}$ | 2473.0 (1), 2475.2 (2) |
| 1. (m) | 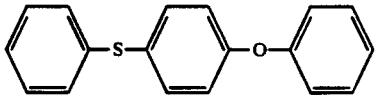 | 2472.6 (1), 2473.75 (2) 2477.4 (3), 2481.30 (4) |

TABLE I-continued

Some of the possible defect structures and characterization of the XANES spectra. The corresponding standardized XANES spectra are shown in FIGS. 1.a) to 1.n). The local absorption maxima of these spectra are shown with an increasing energy position for each defect structure and are marked in the spectra of the Figures (numbers).

| No. of FIG. | Structural formula | Local absorption maxima (all figures in eV) |
|---|---|---|
| 1. (n) | (—⟨C6H4⟩—S—) unpurified cycl. | 2473.29 (1), 2477.02 (2) 2480.70 (3) |

TABLE II

Pure PPS cycles (for production and analytical characterization, see text) - characterization of the XANES spectrum as in Table I.

| No. of FIG. | Structural formula | Local absorption maxima (all figures in eV) |
|---|---|---|
| 2. | (—⟨C6H4⟩—S—) purified cycl. | 2473.57 (1), 2481.05 (2) |

TABLE III

Examples according to the invention - characterization of the XANES spectrum as in Table I

| Example No. | Local absorption maxima (all figures in eV) | |
|---|---|---|
| 1 A | 2473.67 (1) | 2480.88 (2) |
| 1 B | 2474.0 (1) | 2481.26 (2) |
| 2 B | 2474.0 (1) | 2481.30 (2) |

TABLE IV

Comparison Examples

XANES spectra of the Comparison Examples listed in the following Table were recorded as described in the test and standardized to the absolute absorption peak.
The standardized spectra were subtracted from the standardized spectrum of Example 1 B according to the invention. These differences are shown in graph form in FIGS. 2.(a)–(i).
Since the spectral differences between Examples 1 B and 2 B according to the invention are marginal, only the differences in relation to Example 1 B are shown.

| No. of FIG. | No. of Comparison Example |
|---|---|
| 2.(a) | Comparison Example 1 A |
| 2.(b) | Comparison Example 2 A |
| 2.(c) | Comparison Example 3 A |
| 2.(d) | Comparison Example 1 B |
| 2.(e) | Comparison Example 2 B |
| 2.(f) | Comparison Example 3 B |

| | Commercial products for comparison: |
|---|---|
| No. of FIG. | Name of commercial product |
| 2.(g) | FORTRON 1140 B 1 ® |
| 2.(h) | RYTON P4 ® |
| 2.(i) | CRASTON XMB 3100 Natur 40% GF ® |

TABLE V

Number of absorption maxima in the XANES spectrum for determination of chemical uniformity.

| | Number of absorption maxima in the energy range between | |
|---|---|---|
| Example No. | 2470–2475 eV | 2475–2490 eV |
| Example 1 A | one | one |
| Example 1 B | one | one |
| Example 2 B | one | one |
| Comparison Example 1 A | two | two |
| Comparioson Example 2 A | two | two |
| Comparison Example 3 A | two | two |
| Comparison Example 1 B | two | two |
| Comparison Example 2 B | two | two |
| Comparison Example 3 B | two | two |

TABLE VI

Melt viscosities of the Examples as a measure of the molecular weights

| Example no. | $\eta m$ in Pa.s (T = 306° C., D = 1000/sec) | $M_w$ (rel) |
|---|---|---|
| Example 1 A | 980 | 64.137 |
| Example 1 B | 274 | 61.082 |
| Example 2 B | 202 | 57.519 |
| Comparison Example 1 B | 4.5 | n.d. |
| Comparison Example 1 A | 20 | n.d. |
| Comparison Example 2 B | 360 | 68.000 |
| Comparison Example 2 A | 120 | n.d. |
| Comparison Example 3 B | 600 | n.d. |
| Comparison Example 3 A | 390 | n.d. | n.d. = not determined

We claim:

1. Poly-p-arylene sulfide having, in the XANES spectrum at the K edge of the sulfur atom determination of at least ±0.1 (electronvolt or eV)), two absorption maxima in the energy range from 2470 to 2490 eV, namely a) one in the energy range from 2470 to 2475.5 eV, and b) one in the energy range from 2475.5 to 2490 eV, and the absorption maximum of highest intensity lies in the energy range a) and the absorption maximum in the energy range b) has at most 85% of the intensity of the absorption maximum in the energy range a).

2. A poly-p-arylene sulfide as claimed in claim 1, wherein the poly-p-arylene sulfide is a poly-p-phenylene sulfide in which the melt viscosity $\eta_m$ of from 20 to 500,000 Pa.S and the weight average of the relative molecular weight $M_w$ (rel) of from 25,000 to 380,000 bear the following relation $$\lg \eta_w = 3.48 \cdot \lg M_w (\text{rel}) - 14.25 \pm 0.1$$

3. A process for the production of the poly-p-arylene sulfide claimed in claim 1 comprising reacting at least one aromatic dihalogen compound corresponding to formula II

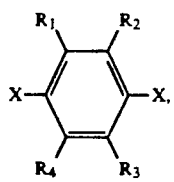

in which
R¹ to R⁴ have the same meanings as defined for formula X represents halogen and 0 to 5 mol-%, based on the sum of the aromatic dihalogen compounds corresponding to formula (II), of an aromatic trihalogen or tetrahalogen compound corresponding to formula (III)

$$ArX_n \qquad (III),$$

in which
Ar is an aromatic or hetercyclic $C_6$–$C_{30}$ radical, in which up to 3 ring C atoms are replaced by heteroatoms,
X represents halogen, and
n represents the numbers 3 or 4,
and 0 to 12 mol-%, based on the sum of the aromatic dihalogen compounds corresponding to formula (II), of molecular weight regulators and a sulfur donor, wherein
(I) the reaction is carried out in an inert gas atmosphere, and
(II) aqueous sulfur donors are mixed with solutions of the aromatic dihalogen compound in an organic solvent, optionally in the presence of known auxiliaries or catalysts, at temperatures above 212° C., the reaction being accompanied by spontaneous elimination of water resulting in water content not exceeding 0 to 0.02% by weight water,
(III) a mixture of alkali sulfide and alkali hydrogen sulfide is the aqueous sulfur donor, from 0.01 to 1 mol alkali hydrogen sulfide per mol alkali sulfide, and
(IV) after addition of the sulfur donor, an excess of aromatic dihalogen compound, must be present and is continuously reduced during the reaction to a final value of from 0 to 0.3 mol-% excess aromatic dihalogen compound through separation by distillation.

4. A process for the production of the poly-p-arylene sulfide claimed in claim 1 comprising reacting at least one aromatic dihalogen compound corresponding to formula (II)

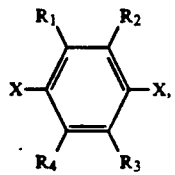

in which
R¹ to Rhu 4 have the meanings defined for formula (I) and

X represents halogen,
and a sulfur donor, wherein the reaction is carried out in an inert gas atmosphere by mixing aqueous sulfur donors with solutions of at least one aromatic dihalogen compound in an organic solvent, optionally in the presence of known auxiliaries or catalysts, at temperatures above 212° C., the reaction being accompanied by spontaneous elimination of water resulting in water content not exceeding 0 to 0.02% by weight water, wherein a mixture of alkali sulfide and alkali hydrogen sulfide is used as the aqueous sulfur donor, 0.01 to 0.5 mol-% alkali hydrogen sulfide being used per mol alkali sulfide, and an excess of aromatic dihalogen compound, is present after addition of the sulfur donor and is continuously reduced during the reaction to a final value of 0 to 0.3 mol-% excess aromatic dihalogen compound through separation by distillation.

5. A poly-p-arylene sulfide according to claim 1 wherein the adsorption maxima a) is in the energy range from 2473 to 2475 eV.

6. A poly-p-arylene sulfide according to claim 1 wherein the adsorption maxima a) is in the energy range from 2473.5 to 2474.1 eV.

7. A poly-p-arylene sulfide according to claim 1 wherein the adsorption maxima b) is in the energy range from 2478 to 2482 eV.

8. A poly-p-arylene sulfide according to claim 1 wherein the adsorption maxima b) is in the energy range from 2480.8 to 2481.4 eV.

9. A poly-p-arylene sulfide according to claim 1 wherein the adsorption maxima b) has at most 80% of the intensity of the adsorption maximum in the energy range a).

10. A poly-p-arylene sulfide according to claim 1 wherein the adsorption maxima b) has at most 73% of the intensity of the adsorption maxima in the energy range a).

11. A poly-p-arylene sulfide according to claim 1 wherein the poly-p-arylene sulfide is poly-p-phenylene sulfide.

12. A poly-p-arylene sulfide according to claim 2 wherein $\eta_m$ and $M_w$ have the following relation $$\lg \eta_m = 3.48 \cdot \lg M_w \text{(rel)} - 14.25 \pm 0.05.$$

13. A process according to claim 3 wherein X is chlorine is bromine.

14. A process according to claim 3 wherein the amount of aromatic trihalogen or tetrahalogen is 0 to 1.25 mol-%.

15. A process according to claim 3 wherein the heteroatoms are N, O, or S.

16. A process according to claim 3 wherein the inert gas atmosphere is nitrogen.

17. A process according to claim 3 wherein an excess of at least 0.1 mol of aromatic dihalogen compound per mol sulfur donor is present in step (IV).

18. A poly-p-arylene sulfide composition comprising the poly-p-arylene sulfide according to claim 1 and fillers, reinforcing materials, or additives.

19. Poly-p-arylene sulfide as claimed in claim 1, containing structural elements corresponding to formula (I)

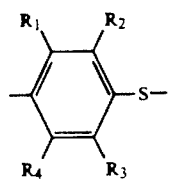
(I)
in which $R_1$, $R_2$, $R_3$, and $R_4$ are the same or different and represent hydrogen (H), $C_1$–$C_{12}$ alkyl, $C_4$–$C_{16}$ cycloalkyl, $C_6$–$C_{20}$ aryl, $C_7$–$C_{30}$ alkaryl or aralkyl.
* * * * *